June 29, 1937.  J. W. COLLINS  2,085,638
ELECTRICAL OUTLET PLANNER
Filed Oct. 10, 1935
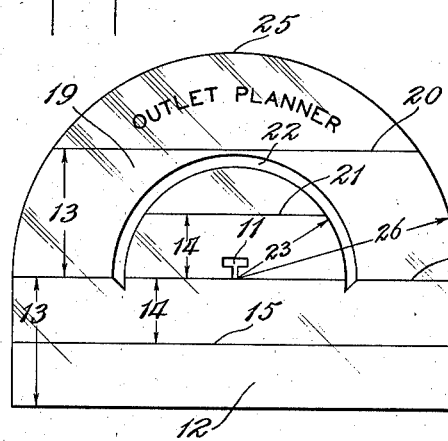
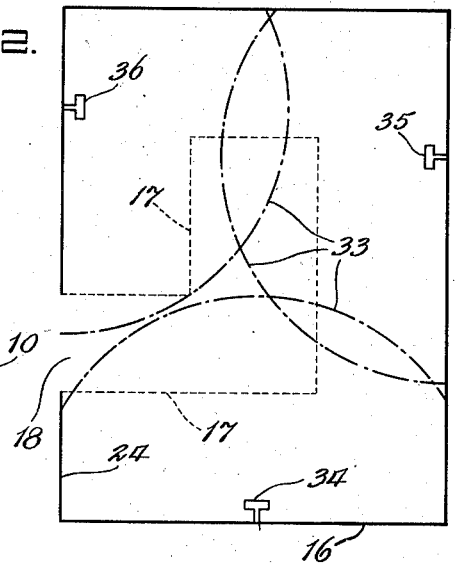
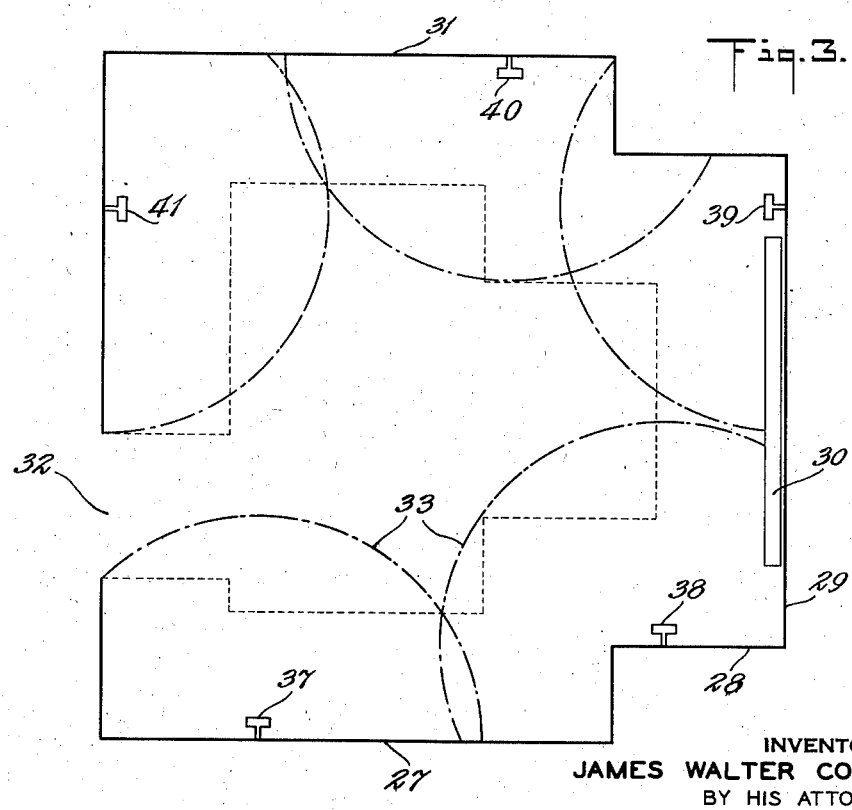
INVENTOR
JAMES WALTER COLLINS
BY HIS ATTORNEYS
Howson and Howson Patented June 29, 1937

2,085,638

UNITED STATES PATENT OFFICE 2,085,638

ELECTRICAL OUTLET PLANNER

James Walter Collins, Oak Park, Ill., assignor to The Bryant Electric Company, Bridgeport, Conn., a corporation of Connecticut Application October 10, 1935, Serial No. 44,446

5 Claims. (Cl. 33—1)

This invention relates to an instrument for planning locations for electrical wiring devices on building plans, and more particularly to such devices when arranged for connection to portable electric appliances or apparatus by means of flexible cords or cables. One of the objects of the invention is to produce an instrument which will facilitate the location of such wiring devices in an efficient manner.

In making plans such as drawings for the installation of electrical equipment, it is necessary to determine the proper location for wiring devices for the connection of the cords or cables of portable electrical appliances or apparatus. There has been no satisfactory rule by which these locations can be chosen, owing to the number of factors involved, and it has heretofore been customary to fix these locations arbitrarily. The result has been either that an unnecessarily large number of outlets were planned or there were a number of positions in the room which could not be reached by an electrical cord of ordinary length. By using a device made in accordance with this invention, it is possible to tell in advance just what areas of the room will receive adequate service from any arrangement of outlets. It is also possible to estimate in advance the effect of any relation between an outlet and the furniture or any other structural features.

In the drawing,

Fig. 1 is a plan view of one instrument embodying my invention;

Fig. 2 is a plan view of a room on which my "outlet planner" has been used, the dotted lines showing the furniture line and the dot-and-dash lines showing the areas covered by electrical cords of normal length; while Fig. 3 is a view similar to Fig. 2, showing the results of using the outlet planner on a larger room.

An instrument in accordance with this invention is adapted to be used on blueprints or other building plans of any kind drawn to any standard scale. The instrument is made of sheet material and preferably is transparent, or at least partly so. The embodiment shown in Fig. 1 is adapted for use on either of two scales of drawings. Thus, for instance, it may be made in such size as to be useful either in a scale of ⅛" to a foot, or ¼" to a foot.

I will first describe those parts of the instrument which enable it to be used on the larger of the two scales. The base line of the instrument is indicated by the number 10 and divides the planner into two portions, one rectangular portion 12 and the other portion 19 semi-circular, the base line 10 forming a long side of the rectangular portion and a diameter of the semi-circular portion. At the middle of this base line is an opening or hole 11 through the celluloid or other material constituting the sheet, which serves as a center for the instrument. In addition, the opening 11 can be shaped to provide an outline for any desired wiring device symbol. In the drawing I have shown the opening 11 in the outline of the conventional symbol for a so-called "convenience outlet" or baseboard receptacle with the base of the symbol at the base line 10 and projecting into the semi-circular portion. It should be understood, however, that where in the claims I speak of "outlet wiring devices" I include not only the so-called "convenience outlet", but any other type of outlet or receptacle, socket, rosette or cord connector, or any other device to which a flexible cord or cable for a portable electric appliance or apparatus can be connected.

In planning locations for convenience outlets, it is advisable to take the furniture in the room into consideration. Thus it is frequently assumed that the area within three or four feet of each wall of the room will be occupied by furniture or other fittings. It is desirable to be able to reach any point on the line defining this area with a cord attached to a convenience outlet in order that portable lamps or other devices may be placed at any point in the room inside the furniture area. In laying out the location for the convenience outlets, it therefore becomes necessary to know what portion of the space in the room will be assumed to be a furniture area, and to this end the rectangular portion 12 of the outlet planner is used. Assuming for the moment—though it is to be understood the invention is not limited in any respect by a specific example—that the large scale is ¼" to 1 foot, the full width 13 of the rectangular portion corresponds to the depth of the area around the wall of the room which should be allotted for furniture or other fittings. When using the smaller scale, the half width portion 14 of the rectangular portion corresponds to the furniture area, and that width is marked off by a line 15 on the median longitudinal line of the rectangle 12.

As the first step in selecting locations for the convenience outlets, it is desirable, therefore, to lay out the furniture line or area, and this is done by placing the planner on the plans with the base line 10 along the wall of the room, as for instance, wall 16 of Fig. 2, with the rectangular portion 12 inside the wall of the room. A dotted line 17 then can be drawn from the door 18 of the room to a point where it joins the furniture line on the adjacent wall, and by moving the outlet planner to each wall successively, the entire dotted line showing of Fig. 2 can be made, thus laying off the entire furniture area for the room. Fig. 3 or any other room would be done in a similar manner.

The semi-circular portion 19 of the planner has a radius which is greater than the width of the rectangular portion 12 and has lines 20 and 21 drawn thereon parallel to the base line at a distance from the base line equal to the full width 13 and the half width 14 respectively of the rectangular portion. If it is not desired to draw the furniture line on the building plans, these lines 20 and 21 will serve if the planner is made of transparent material. It is somewhat more convenient, however, to put in the furniture line by using the rectangular portion, because as the planner is moved from one position to another, the furniture line adjacent the momentary position of the planner will also be shown.

In the example of the planner shown in the drawing, the outside dimension is a semi-circular edge 25 having a radius 26 which on the large scale of the planner corresponds to the normal or average cord length of portable electric appliances or apparatus. For the small scale on the planner there is a semi-circular cut 22 in the planner having a radius 23 corresponding to the cord length on a small scale, both the outer edge 25 of the planner and the inner cut 22 being swung on the symbol opening 11 as a center.

Assuming that it is desired to start selecting convenience outlet locations on Fig. 2 with the planning starting adjacent the door 18, the base line 10 is laid on the wall 16 adjacent the door instead of on the short wall 24 beside the door because that short wall 24 is no longer than the depth of the furniture area. The semi-circular portion 19 of the planner faces into the room and the rectangular portion 12 lies outside the room. By sliding the planner along the wall 16, keeping the base line 10 of the planner on the wall, a position will be found where the outlet is as far from the door 18 as it can be put and still leave the fixture inside the furniture line 17 reasonably adjacent to the door 18. Having determined this point, the planner will take his pencil and outline the opening 11, thereby placing on the drawing the most desirable location for one convenience outlet 34. The arc of the normal cord length is indicated in Fig. 2 by dot-and-dash lines 33. The outlet planner is then moved around the room, and in this case onto the adjacent wall to the right, with the semi-circular portion still facing into the room. The outlet planner is then slid back and forth on the wall until the radius which represents the cord length just overlaps the dot-and-dash line 33 of the first outlet position outside the furniture area. This outlet 35 is placed slightly nearer the wall 16 than otherwise necessary in order to increase the distance outside the furniture line which can be reached by a cord from this second outlet. It will also be noted, however, that this second outlet is not placed so near the wall 16 that any portion of the furniture area on the wall opposite 16 is left uncovered. By testing with the outlet planner on the wall opposite 16 and on the long wall to the left of the door 18, it is found that it is not necessary to have an outlet on the wall opposite 16 but that with a normal cord length an outlet 36 on the wall to the left of the door 18 will be sufficient. In view of the location of the door 18, it is not necessary for this outlet to be as near the wall 16 as the outlet on the wall opposite the door 18. It is therefore possible for this third outlet to take care of somewhat more than half of the wall opposite 16 and still reach the furniture line at the door 18. When the dot-and-dash lines 33 for the second and third convenience outlets are drawn in, it will be observed that the only portion of the room which cannot be reached with a cord of normal length is a small, somewhat triangular-shaped portion in the very center of the room. In this way it will be seen that the minimum number of outlets have been planned which will cover the room completely and adequately, and their proper location is determined without calculation.

The use of the planner in a room such as shown in Fig. 3 is slightly different. In this instance the door 32 is slightly further from the wall 27 on which calculations are begun, than was the case with door 18 and wall 16 in Fig. 2. Therefore, in order to cover the area near the door it is necessary to move the first outlet 37 slightly nearer to same. By testing with the outlet planner it is discovered that there is no need for any outlet on the wall 27 other than the first one 37 and that the next outlet position which is necessary in order to take care of the area inside the furniture line to the right of the area covered by the first outlet is on the wall 28. The arc 33 from the second outlet 38 on the wall 29 meets a long radiator 30 on that wall. Since it is unlikely that it will be desired to locate any portable electric appliance, such as a bridge lamp, directly in front of the middle of the radiator 30 outside the furniture line, it is not necessary for the third outlet to be so located as to have its arc 33 intersect the arc of the second outlet outside the furniture line. Therefore the third outlet 39 can be placed beyond the radiator and by trial it is found that this is possible and that it will take care of a considerable portion of the room. Continuing the trial locations with the outlet planner, the fourth outlet 40 can be put on the wall 31 opposite the wall 27, and by keeping same pretty well toward the radiator part of the room, an area out as far as the furniture line can be made available. The outlet planner also calls attention to the fact that in this position the furniture line is further from the wall than usual owing to the jog in the wall, and it can be decided at that time whether or not it will be adequate to have the outlet so arranged that the cord cannot go beyond the furniture line at that specific point. The last outlet 41 in the room will be on the wall to the left of the door 32 and overlap the radius 33 of the last-mentioned outlet just at the furniture line.

It will be observed that if desired the locating of the outlets in this figure can be run in the opposite direction from the door 32 and of course the locating done going in one direction can always be checked by taking it in the opposite direction.

It will also be observed that by making this planner of transparent material it is not necessary to draw in any particular furniture line until the location of the adjacent outlets has been planned, though means are provided for drawing in the furniture lines in advance, if that is desired. It will also be observed that the furniture line along the next wall at right angles to the one on which the planner is placed can also be gauged by the eye by making use of the point at which the line 20 or the line 21 intersects the edge 25 or the cut 22. The arc 33 can be made greater or less than 180°, as much as desired, and it is even possible to make the device in a complete circle without the rectangle 12. It should be noted that by using this planner it is insured that the room can be adequately lighted from the convenience outlets as laid out. Any other desirable information may be imprinted on the planner, such for instance as angles from the outlet symbol or indicia with regard to dimensions on the reduced scales of the planner, and if desired the edge 25 or the cut 22 may have indentations or irregularities therein to indicate any desired information, such for instance as the intersection of such arcs with the furniture line. In effect the use of this planner enables the person using it to see at a glance what the results are in locating an outlet at any desired point, and having once chosen the proper point, the planner provides instantaneous means of marking same on the plans. It makes it possible to coordinate each location with the others and the furniture.

Many variations which do not depart from the scope of this invention will occur to those skilled in the art.

What I claim is:

1. An instrument to select positions for electrical outlet wiring devices on building plans, comprising a transparent sheet having an opening therein representing a wiring device location to be placed at a wall in a room on the building plans, and an edge on said sheet circumscribing, on the scale of the building plans, the area which can be reached from the wiring device by a given length of cord attached thereto, in combination with indicia on said instrument indicating the area occupied by furniture in the cord area.

2. An instrument to select positions for electrical outlet wiring devices on building plans, comprising a transparent sheet having an opening therethrough shaped to act as a guide for a pencil in making a wiring device symbol on the plans, in combination with a wall or base line contacting the base of the symbol opening, an edge on said sheet circumscribing, on the scale of the building plans, the area which can be reached from the wiring device by a given length of cord.

3. An instrument to select positions for electrical outlet wiring devices on building plans, comprising a transparent sheet having an opening therethrough shaped to act as a guide for a pencil in making a wiring device symbol on the plans, in combination with a wall or base line contacting the base of the symbol opening, an edge on said sheet circumscribing, on the scale of the building plans, the area which can be reached from the wiring device by a given length of cord, and an area within said cord area on said sheet indicating the portion of the floor space near the wiring device which is likely to be occupied by furniture.

4. A planner for selecting electrical wiring device locations on building plans comprising a piece of transparent sheet material having an opening therethrough for a wiring device location, in combination with elements defining an area to scale which can be reached by a cord of normal length attached to the wiring device, said elements comprising an edge representing an arc described by the cord and a wall line intersecting the opening.

5. A planner for selecting electrical wiring device locations on building plans comprising a piece of transparent sheet material having an opening therethrough for a wiring device location, in combination with elements defining an area to scale which can be reached by a cord of normal length attached to the wiring device, said elements comprising an edge representing an arc described by the cord, a wall line intersecting the opening and the edge, and indicia contacting said edge, indicating the portion of said area in which furniture is likely to be placed.

JAMES WALTER COLLINS.